May 17, 1927.
G. B. DUFFIELD
VALVE OPERATING DEVICE
Filed Aug. 25, 1926
1,629,449
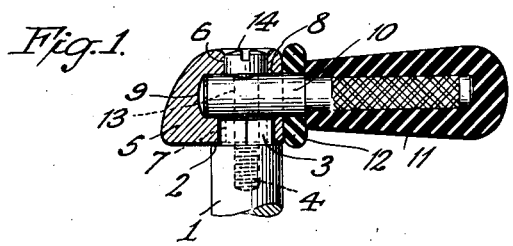
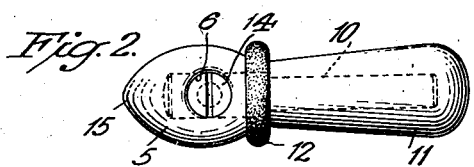
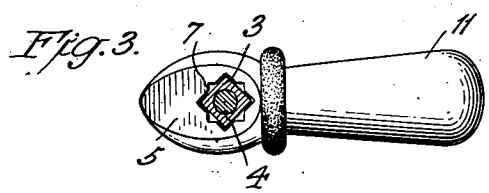
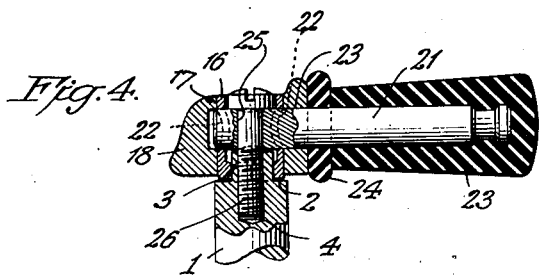
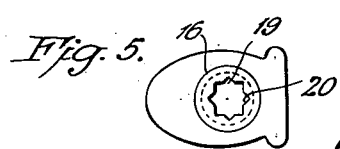
INVENTOR.
George Bethune Duffield
BY
his ATTORNEY.

Patented May 17, 1927.

1,629,449

UNITED STATES PATENT OFFICE.

GEORGE BETHUNE DUFFIELD, OF DETROIT, MICHIGAN, ASSIGNOR TO DETROIT LUBRICATOR COMPANY, OF DETROIT, MICHIGAN, A CORPORATION OF MICHIGAN.

VALVE-OPERATING DEVICE.

Application filed August 25, 1926. Serial No. 131,340.

My invention relates to new and useful improvements in valve-operating devices, and more particularly to means for attaching a handle, or equivalent operating device, to a rotary valve-operating member or stem, whereby the latter may be rotated to operate a valve.

The valve consists in the improved construction and arrangement of parts to be more fully described hereinafter, and the novelty of which will be particularly pointed out and distinctly claimed.

In the accompanying drawings to be taken as a part of this specification, I have shown a preferred embodiment of my invention, in which drawings—

Figure 1 is a sectional view of the device shown in elevation;

Fig. 2 is a plan view of the same;

Fig. 3 is a bottom view;

Fig. 4 is a sectional view of a modification shown in elevation, and

Fig. 5 is a detail view of the modification.

Similar characters of reference refer to similar parts throughout the several views.

In the preferred embodiment shown, 1 designates a rotary valve-operating member or stem, the lower end portion of which (not shown) is suitably connected to a valve (not shown) for operating the same. The connection between the stem and the valve in relation to which it is to be used forms no part of my present invention, and it is therefore not necessary to show or describe the same.

At its upper end the valve stem 1 is provided with an annular shoulder 2 and a vertical extension or boss 3 which is formed with side faces at angles to each other, whereby said boss, in its preferred form, is rectangular in cross-section. Extending axially through said boss and into the stem is a threaded socket 4, to serve a purpose to be presently set forth. In the embodiment shown in Figs. 1 to 3, inclusive, 5 designates an attaching member, preferably in the form of a cap-piece. The cap-piece is provided with a vertical bore 6, the lower portion of which is annular, and is serrated or toothed on its inner face, as at 7, so that said annular portion 6 may set over the boss 3, with the said teeth or notches between the teeth engaging the corners or intersections of the flat faces on said boss. It will be seen that the said cap-piece may be rotatably adjusted relative to the stem by removing said cap-piece, and after giving it a turn to the desired angle, replacing it in engagement with said boss. The serrated or toothed annular bore provides for a plurality of angular adjustments of the cap-piece relative to the stem, and at the same time affords a rigid operative connection between the cap-piece and the stem.

The body of the cap-piece at a point above the upper end of the boss 3, when the cap-piece is applied to the stem, is provided with a lateral socket or passageway 8, which at its outer end opens through the side wall of the cap-piece (see Fig. 1), and at its inner end forms a socket 9 in one side of the vertical bore 6 in the cap-piece. It will be understood that the transverse bore formed by the passageway 8 and the socket 9 intersects the vertical bore 6 and is at right angles to the latter. Extending through the bore or passageway 8 and into the socket 9 is a handle member in the form of a bar 10, the inner portion of which is preferably cylindrical and of such diameter as to form a sliding fit with said passageway and socket, said bar when in position in the cap-piece overlying the upper portion of the boss 3 heretofore described. This handle bar is provided on its outer end with any suitable hand-grasp 11, which may be of wood, bakelite, hard rubber, or other suitable substance. The inner end of said hand-grasp is spaced from the adjacent side face of the cap-piece 5 by means of a washer 12 of suitable heat-insulating material. The handle bar is provided with a transverse opening 13, which normally alines with the bore 6 and the threaded socket 4 heretofore described, and passing through said bore 6 and opening 13 and threaded into the socket 4 is a fastening device, preferably in the form of a headed clamping screw 14, the head of which overlies the upper face of the cylindrical part or bar 10 and is seated or housed within the upper end of the passage 6. It will be seen that when the screw 14 is threaded into place, the head will press directly upon the cylindrical part 10, which in turn will act upon the lower portions of passage 8 and socket 9 to secure the cap-piece 5 in place on the boss 3 and against the shoulder 2. It will be seen that by removing the screw 14 the cap-piece 5 may be disengaged from the boss 3 and rotatably adjusted and replaced relative to the stem, so that the angle of the handle bar to the stem may be adjusted, and the attaching device and handle then secured in position by screwing the screw into place, as shown in Fig. 1, said screw constituting a single fastening means for securing the handle bar to the attaching device and the attaching device to the stem.

The attaching device 5 may be formed at one side with a protuberance or nose 15, which will serve as a pointer for cooperation with a dial for that type of valve known as fractional valves employed in connection with vapor heating systems. The provision for rotative adjustment of the cap-piece relative to the stem affords a simple and convenient means for adjusting the handle and pointer relative to the valve and the dial of such valves (not shown).

In the modification shown in Figs. 4 and 5, I have shown the invention embodied in a structure in which the attaching device or cap-piece may be made in part of composition material similar to that heretofore described as being used for the handle, namely, bakelite, etc., in which case the invention will be found particularly desirable, because such material applied to the cap-piece will be relieved of strain or pressure exerted by the fastening device or screw in holding the cap-piece and handle in place, and cracking or splitting of such composition material is thereby prevented.

I have accomplished this end by placing a cup-shaped, metallic sleeve 16 in a vertical hole 17 through the cap-piece 18 of composition material which may be molded on said sleeve. The base or bottom of the sleeve 16 has a central opening 19 which is serrated or notched annularly, as at 20, so that it may be adjustably fitted over the square portion or boss 3 on the end of the stem 1. The operating member or handle includes a bar 21 which is socketed in a lateral hole 23 in the cap-piece 18 and through opposite openings 22 in the wall of sleeve 16, so that said bar overlies the upper end of the stem as in the form of Fig. 1.

Also carried by the bar 21 is a hand-grip 23 formed or fixed thereon, as defined above with respect to Figs. 1, 2 and 3, and an insulating ring or disc 24 may be arranged intermediate the grip and the cap-piece. An opening 25 is drilled or otherwise made through bar 21 over the stem and in line with threaded socket 4 to permit the screw 26 to pass axially through the sleeve 16 and into the threaded socket 4 in the stem. By the use of the above-defined construction, it is apparent that tightening of the screw 26 will not strain the material of the cap-piece 18, as the head of the fastening screw bears solely and directly upon the upper face of the bar 21, which bar in turn bears upon the walls of the openings in the side wall of the sleeve 16, whereby the lower end of the sleeve 16 will be pressed down into place about the boss 3 and against the shoulder 2 on the stem 1 without pressure or strain being exerted on the composition which is molded on the sleeve 16. It is to be noted that the lower end or base of the sleeve 16 projects slightly below the lower end or face of the material molded on the sleeve, so that such material is not clamped or pressed against the shoulder 2.

In the modified form the attaching device or handle-operating member is also rotatably adjustable relative to the stem 1 in the same manner as described above with respect to the form shown in Figs. 1, 2 and 3.

What I claim and desire to secure by Letters Patent of the United States is:—

1. A device of the character described comprising a valve stem, a cap-piece on said stem and having a transverse bore, a handle member seated in said bore, and a fastening device extending through said cap-piece and engaging said member and stem to secure said member to the stem.

2. A device of the character described comprising a valve stem, a cap-piece on said stem and having a bore in line with the stem and having a transverse bore, a handle member seated in said transverse bore and overlying said stem, and a fastening device extending through said first-named bore and engaging said member and stem to secure said member to the stem.

3. A device of the character described comprising a valve stem, a cap-piece on said stem and having a bore in line with the stem and having a stransverse bore, a handle member seated in said transverse bore and overlying said stem, said member having a transverse opening overlying said stem, and a fastening device extending through said first-named bore and said opening and engaging said member and stem to secure said member to the stem.

4. A device of the character described comprising a valve stem, a cap-piece on said stem and having a bore in line with the stem and having a transverse bore, a handle member seated in said transverse bore and overlying said stem, and a headed fastening device extending through said first-named bore, the head engaging said member and said device engaging the stem to secure said member to the stem.

5. A device of the character described comprising a valve stem, a cap-piece on said stem and having a bore in line with the stem and having a transverse bore, a handle member seated in said transverse bore and overlying said stem, said member having a transverse opening overlying said stem, and a fastening screw extending through said first-named bore and said opening and threaded into said stem to secure said member to the stem.

6. A device of the character described comprising a valve stem, a cap-piece on said stem and having a bore in line with the stem and having a transverse bore, a handle member seated in said transverse bore and overlying said stem, said member having a transverse opening overlying said stem, and a headed fastening screw extending through said first-named bore and said opening and threaded into said stem, the head of said screw overlying said member.

7. A device of the character described comprising a valve stem, a cap-piece on said stem and having a bore in line with the stem and a transverse bore intersecting said first-named bore and forming an internal socket, a handle member in said transverse bore and extending across said first-named bore and seated in said socket, said member overlying said stem, and a fastening device extending through said first-named bore and engaging said member and stem to secure said member to the stem.

8. A device of the character described comprising a valve stem, a cap-piece on said stem and having a bore in line with the stem and a transverse bore intersecting said first-named bore and forming an internal socket, a handle member in said transverse bore and extending across said first-named bore and seated in said socket, said member overlying said stem, said member having a transverse opening overlying said stem, and a headed fastening screw extending through said first-named bore and said opening and threaded into said stem, the head of said screw overlying said member.

9. A device of the character described comprising a valve stem having an angularly faced boss, a cap-piece on said stem and having a bore in line with said stem, said bore having serrations to engage said boss, said cap-piece having a transverse bore, a handle member seated in said transverse bore and overlying said stem, and a fastening device extending through said first-named bore and engaging said member and stem to secure said member to the stem.

10. A device of the character described comprising a valve stem, a cap-piece having a sleeve engaging said stem, said cap-piece and sleeve having a transverse bore, a handle member seated in said bore, and a fastening device extending through said sleeve and engaging said member and stem to secure said member to the stem.

11. A device of the character described comprising a valve stem, a cap-piece having a cup-shaped sleeve engaging said stem, said cap-piece and sleeve having a transverse bore, a handle member seated in said bore, and a fastening device extending through said sleeve and engaging said member and stem to secure said member to the stem.

12. A device of the character described comprising a valve stem, a cap-piece having a vertical hole, a sleeve in said hole engaging said stem, said cap-piece and sleeve having a transverse bore, a handle member seated in said bore, and a headed fastening device extending through said sleeve, the head engaging said member and said device engaging the stem to secure said member to the stem.

13. A device of the character described comprising a valve stem, a cap-piece having a vertical hole, a cup-shaped sleeve mounted in said hole and having a central opening in its base engaging said stem, a transverse bore intersecting said hole and forming an internal socket, a handle member in said transverse bore and extending across said hole and seated in said socket, said member overlying said stem, said member having a transverse opening overlying said stem, and a headed fastening screw extending through said sleeve and said last-named opening and threaded into said stem, the head of said screw overlying said member.

14. A device of the character described comprising a valve stem having an angularly faced boss, a cap-piece having a vertical hole, a cup-shaped sleeve mounted in said hole and having a central opening in its base, said opening having serrations to engage said boss, a transverse bore intersecting said hole and forming an internal socket, a handle member in said transverse bore and extending across said hole and seated in said socket, said member overlying said stem, said member having a transverse opening overlying said stem, and a headed fastening screw extending through said sleeve and said last-named opening and threaded into said stem, the head of said screw overlying said member.

In testimony whereof I have hereunto subscribed my name.

GEORGE BETHUNE DUFFIELD.